United States Patent
Freund et al.

(10) Patent No.: US 6,898,996 B2
(45) Date of Patent: May 31, 2005

(54) NOISE AND VIBRATION REDUCING FLEX-CABLE ASSEMBLY

(75) Inventors: Roger Freund, Belle River (CA); Pascal Emanuel Garrido, Kilworthy (CA); Richard Allen Lagerweij, Thornton (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 5 days.

(21) Appl. No.: 10/712,726

(22) Filed: Nov. 12, 2003

(65) Prior Publication Data

US 2004/0093977 A1 May 20, 2004

Related U.S. Application Data

(62) Division of application No. 09/662,418, filed on Sep. 14, 2000, now Pat. No. 6,668,680.

(51) Int. Cl.[7] .................................................. G05G 1/14
(52) U.S. Cl. ........................ 74/560; 74/502.4; 74/502.5
(58) Field of Search ....................... 74/512, 560, 502.4, 74/502.5, 502

(56) References Cited

U.S. PATENT DOCUMENTS

| | | | |
|---|---|---|---|
| 2,801,530 A | | 8/1957 | Holt |
| 2,872,793 A | | 2/1959 | Botti |
| 3,354,742 A | | 11/1967 | Ischanz |
| 4,560,365 A | | 12/1985 | Weaver |
| 4,850,242 A | * | 7/1989 | Hass et al. .................... 74/512 |
| 5,397,270 A | | 3/1995 | Pipp et al. |
| 5,461,938 A | * | 10/1995 | Froling et al. ............. 74/502.4 |
| 5,613,405 A | * | 3/1997 | Kelley et al. .............. 74/502.4 |
| 5,791,622 A | | 8/1998 | Gauger |
| 5,890,399 A | * | 4/1999 | Rixon et al. .................. 74/512 |
| 5,907,978 A | * | 6/1999 | Malone et al. ............ 74/502.6 |
| 5,938,164 A | | 8/1999 | Kargol |
| 6,189,407 B1 | * | 2/2001 | Champ et al. ............ 74/502.4 |
| 6,209,414 B1 | * | 4/2001 | Uneme ...................... 74/502.4 |
| 6,263,757 B1 | * | 7/2001 | Kawahara .................. 74/502.6 |
| 6,634,252 B2 | * | 10/2003 | Mayville et al. .......... 74/502.6 |
| 6,668,680 B1 | * | 12/2003 | Freund et al. ................ 74/512 |

FOREIGN PATENT DOCUMENTS

EP            0239984 A2 * 3/1987

\* cited by examiner

*Primary Examiner*—David M. Fenstermacher
(74) *Attorney, Agent, or Firm*—Porter Waaht; Richard M. Mescher; Dean H. Watson

(57) ABSTRACT

A flexible drive cable assembly for powered adjustable pedals includes an elongate flexible casing having a unitary connector which cooperates with an end fitting to secure the casing to the end fitting and hold the casing stationary relative to the end fitting. In one embodiment, the unitary connector and the end fitting form a snap-fit connection having both an interlock and an interference fit between the casing and the end fitting to reduce vibration. In another embodiment, the casing is heat staked to the end fitting such that casing material flows into grooves to form protrusions which interlock with the end fitting and an interference fit between the casing and the end fitting to reduce vibration. In another embodiment, the unitary connector includes an elongate portion press fit into an aperture of the end fitting and a flange engaging the end fitting adjacent the aperture.

20 Claims, 7 Drawing Sheets

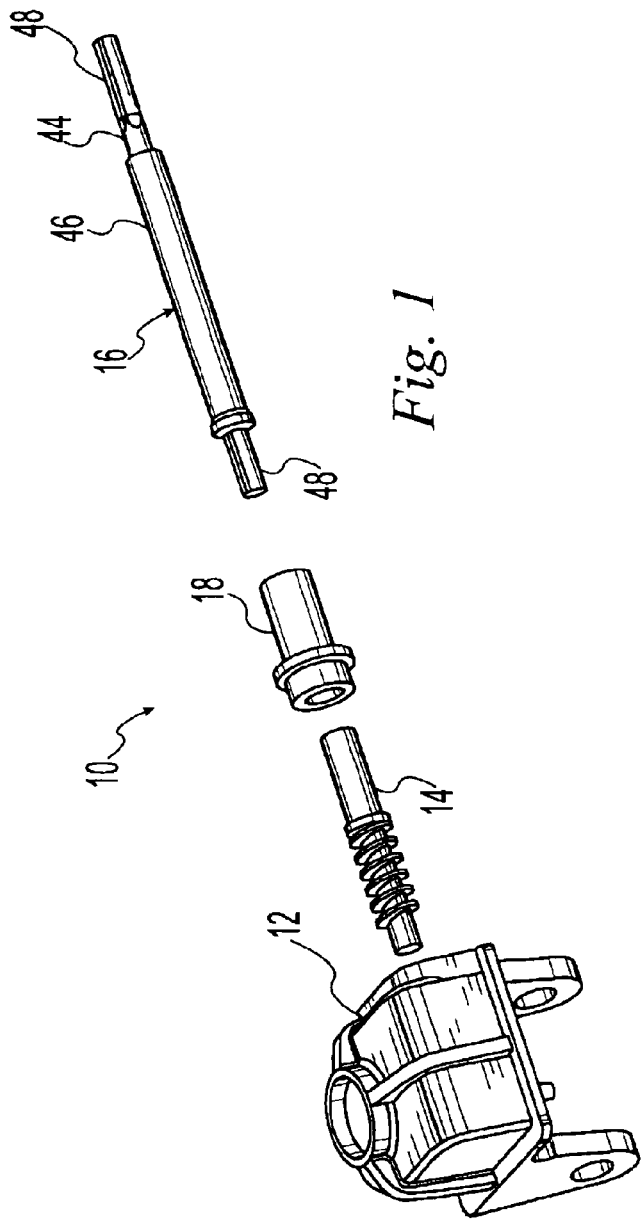
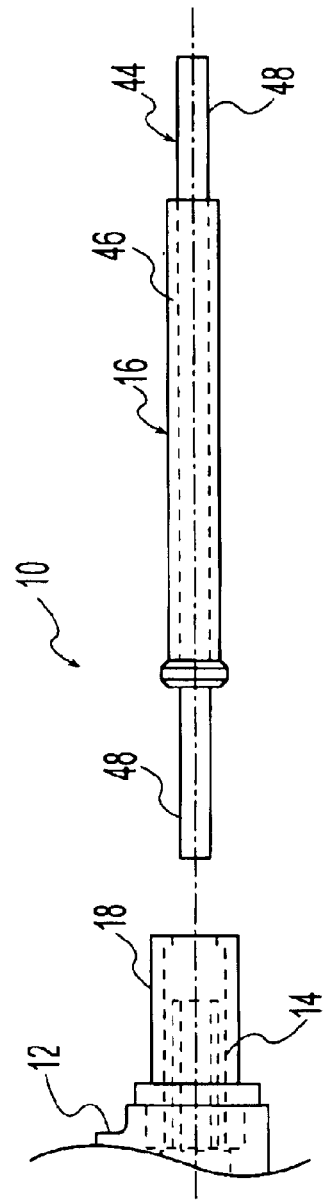

NOISE AND VIBRATION REDUCING FLEX-CABLE ASSEMBLY

CROSS-REFERENCE TO RELATED APPLICATIONS

This application is a divisional of patent application Ser. No. 09/662,418 filed on Sep. 14, 2000, now U.S. Pat. No. 6,668,680.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a flexible cable assembly which transmits torque between rotary shafts and, more particularly, to such a flexible cable assembly for powered adjustable seats, adjustable pedals or the like used in motor vehicles.

BACKGROUND OF THE INVENTION

Flexible cables are used in many applications to transmit rotary motion or torque from a driving shaft to a driven shaft. The flexible cable typically includes an outer protective sheath or casing and an inner drive member or core disposed within the outer protective casing. The ends of the outer protective casing are attached to fixed members such as motor or gear box housings and the ends of the core are connected to driving and driven elements such as rotary shafts. The driving element moves the core which transfers the movement to the driven element. Flexible cables are advantageous because they transfer movement when there is misalignment or noncoaxial alignment between the driving and driven elements. The flexible cables, however, often have vibration during operation which can cause undesirable noise and can become unintentionally disconnected due to vibrations or other forces.

Attempts have been made to strengthen the connection of flexible cables. See, for example, U.S. Pat. No. 5,397,270, the disclosure of which is expressly incorporated herein in its entirety by reference, which discloses a flex shaft cover retention device. The cover or sheath of the flex shaft is stretched over a fixed coupling having at least one radially extending projection. While this retention device may be an improvement over some prior art configurations, it remains less than ideal. The pull off strength of the sheath may be less than desirable because of the lack of an interlocking connection between the sheath and the coupling. Additionally, the sheath is difficult to install due to the amount of stretching that is required and may not be reusable do to stretching. Accordingly, there is a need in the art for an improved flexible cable assembly which has ease of assembly, adequate pull off strength, and/or reduced noise caused by vibrations during operation.

SUMMARY OF THE INVENTION

The present invention provides a flexible drive cable assembly which overcomes at least some of the above-noted problems of the related art. According to the present invention a an adjustable pedal assembly comprises, in combination, a flexible drive cable assembly, an electric motor and at least one drive screw. The flexible drive cable assembly connects the electric motor and the drive screw such that operation of the electric motor rotates the drive screw. The flexible drive cable assembly comprises an elongate flexible core for transmitting movement from a first end of the core to a second end of the core and an elongate flexible casing encircling a longitudinal length of the core and having a preformed unitary connector at one end. The first end of the core has a first connection and the second end of the core has a second connection and the casing extends along the longitudinal length of the core from the first connection of the core to the second connection of the core. An element is operably connected to the core for transmission of movement therebetween and an end fitting has an aperture for passage of the core therethrough. The unitary connector of the casing cooperates with the end fitting to secure the casing to the end fitting and hold the casing stationary relative to the end fitting.

According to another aspect of the present invention, an adjustable pedal assembly comprises, in combination, a flexible drive cable assembly, an electric motor, and at least one drive screw. The flexible drive cable assembly connects the electric motor and the drive screw such that operation of the electric motor rotates the drive screw. The flexible drive cable assembly comprises an elongate flexible core for transmitting movement from a first end of the core to a second end of the core and an elongate flexible casing encircling a longitudinal length of the core and having a preformed, unitary connector with at least one deflectable protrusion. An element is operably connected to the core for transmission of movement therebetween and an end fitting has an aperture for passage of the core therethrough. The connector of the casing and the end fitting form a snap-fit connection to secure the casing to the end fitting and hold the casing stationary relative to the end fitting and the deflectable protrusion of the connector engages the end fitting with an interference fit such that the deflectable protrusion is in an unrelaxed state to reduce vibration between the casing and the end fitting.

According to yet another aspect of the present invention, an adjustable pedal assembly comprises, in combination, a flexible drive cable assembly, an electric motor, and at least one drive screw. The flexible drive cable assembly connects the electric motor and the drive screw such that operation of the electric motor rotates the drive screw. The flexible drive cable assembly comprises an elongate flexible core for transmitting movement from a first end of the core to a second end of the core and an elongate flexible casing encircling a longitudinal length of the core and having generally coaxial inner and outer surfaces. An element is operably connected to the core for transmission of movement therebetween and an end fitting has an elongated portion with an outer surface and an aperture for passage of the core therethrough. The outer surface of the elongated portion has at least one groove formed therein. The casing has a preformed enlarged cylindrically-shaped end portion forming an end surface of the casing and having an inner diameter closely receiving the elongated portion of the end fitting. The casing has at least one protrusion extending from the inner surface of the casing and into the groove of the elongated portion to interlock the casing with the end fitting and to hold the casing stationary relative to the end fitting.

According to even yet another aspect of the present invention, an adjustable pedal assembly comprises, in combination, a flexible drive cable assembly, an electric motor, and at least one drive screw. The flexible drive cable assembly connects the electric motor and the drive screw such that operation of the electric motor rotates the drive screw. The flexible drive cable assembly comprises an elongate flexible core for transmitting movement from a first end of the core to a second end of the core and an elongate flexible casing encircling a longitudinal length of the core and having a connector. The connector comprises a preformed, unitary enlarged end portion having a generally cylindrically shaped outer surface and a flange extending generally perpendicular to the outer surface of the elongated portion. An element is operably connected to the core for transmission of movement therebetween. An end fitting has an aperture for passage of the core therethrough. The outer surface of the connector extends through the aperture of the end fitting and the flange of the connector engages the end fitting adjacent the aperture of the end fitting to secure the casing to the end fitting and to hold the casing stationary relative to the end fitting.

From the foregoing disclosure and the following more detailed description of various preferred embodiments it will be apparent to those skilled in the art that the present invention provides a significant advance in the technology and art of flexible drive cable assemblies. Particularly significant in this regard is the potential the invention affords for providing a high quality, reliable, light weight, low cost assembly which is relatively quiet during operation. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 1 is an exploded perspective view of a flexible drive cable connection according a first preferred embodiment of the present invention;

FIG. 2 is an enlarged, partially-exploded elevational view of the flexible drive cable connection of FIG. 1;

Figure 6:
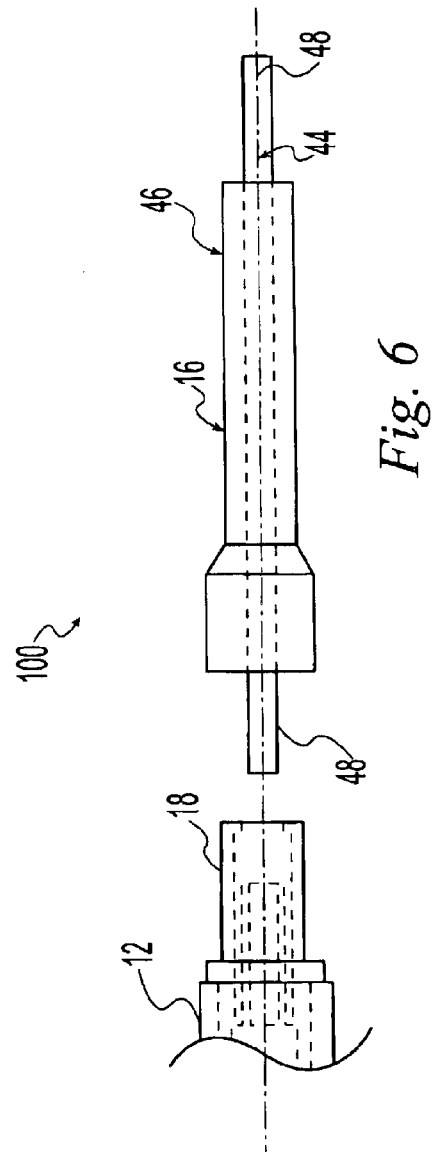
FIG. 6 is an enlarged, partially-exploded elevational view of the flexible drive cable connection of FIG. 5.
Figure 7:
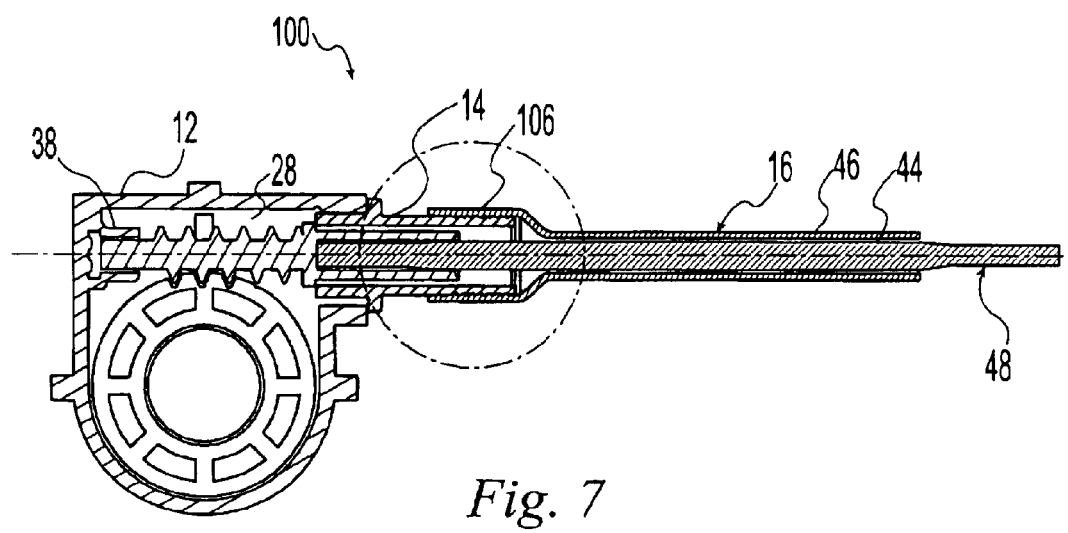
FIG. 7 is a elevational view, in cross-section, of the flexible drive cable of FIGS. 5 and 6.

It should be understood that the appended drawings are not necessarily to scale, presenting a somewhat simplified representation of various preferred features illustrative of the basic principles of the invention. The specific design features of the flexible drive cable assemblies as disclosed herein, including, for example, specific dimensions, orientations, and shapes of the outer casing will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the flexible drive cable connection illustrated in the drawings. In general, up or upward refers to an upward direction in of the plane of the paper in FIGS. 2, 6 and 10 and down or downward refers to a downward direction in the plane of the paper in FIGS. 2, 6 and 10.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved flexible drive cable assemblies disclosed herein. The following detailed discussion of various alternative and preferred embodiments will illustrate the general principles of the invention with particular reference to powered adjustable seats and adjustable pedals each for use with a motor vehicle. Other embodiments suitable for other applications will be apparent to those skilled in the art given the benefit of this disclosure. The term "snap-fit connection" is used herein and in the claims to mean a connection between at least two components wherein at least one of the components has a protrusion which is resiliently deformable such that the protrusion is deformed as the components are moved together and resiliently snaps back from the deformation once the components are together to secure the components together. The term "unitary" is used herein and in the claims to mean a member of continuous material formed as one piece such as, for example, a molded member of a single material or a member of continuous integral material or materials such as an insert molded, co-molded, or overmolded member.

Referring now to the drawings, FIGS. 1 to 4 show a flexible drive cable assembly 10 for powered adjustable seat of a motor vehicle, such as an automobile, according to a preferred embodiment of the present invention. While the illustrated embodiments of the present invention are particularly adapted for use with an automobile, it is noted that the present invention can be utilized with any motor vehicle having a powered adjustable seat including trucks, buses, vans, recreational vehicles, earth moving equipment and the like, off road vehicles such as dune buggies and the like, air borne vehicles, and water borne vehicles.

The illustrated flexible drive cable assembly 10 includes a fixture or housing 12 having a rotary element or shaft 14 journaled therein and a flexible drive cable 16 operably connected to the housing 12 and the rotary element 14. The flexible drive cable 16 transmits rotary power or motion from a driving element, such as the rotary element 14, through a nonlinear or curved path to a driven element. The flexible drive cable 16 enables torque to be transmitted between the rotary elements 14 even when the rotary elements are misaligned or mounted in a non-coaxial manner.

The housing 12 preferably includes an end fitting or coupling 18 for connecting the flexible drive cable 16 to a stationary element near the rotary element 14. The illustrated end fitting 18 is formed separately from the housing 12 and is rigidly secured to the housing 12 but the end fitting can alternatively be formed integrally with the housing 12. The illustrated end fitting 18 is generally tubular shaped forming cylindrically shaped and substantially coaxial inner and outer surfaces 20, 22. The end fitting 18 forms an aperture 24 which opens into an axially extending inner conduit or passage 26 sized and shaped for closely receiving the rotary element 14 therein. The end fitting 18 outwardly extends from the housing 12 such that the inner end of the passage 26 opens into the interior space 28 of the housing and the outer end of the passage 26 opens to exterior space surrounding the housing 12.

Figure 3:
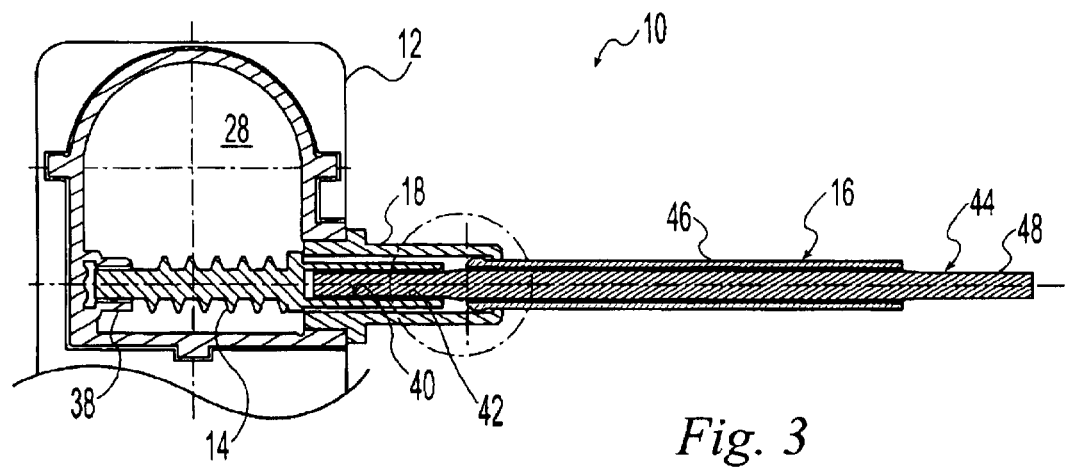
FIG. 3 is a elevational view, in cross-section, of the flexible drive cable of FIGS. 1 and 2.
Figure 4:
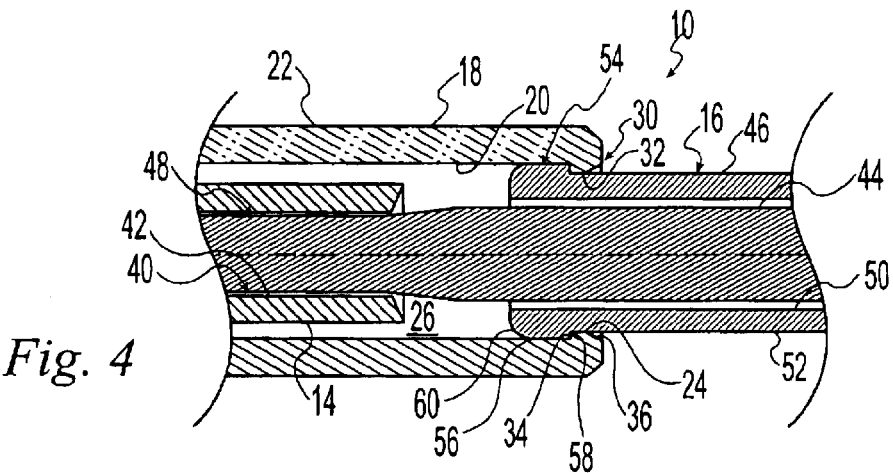
FIG. 4 is an enlarged, fragmented view of a portion of FIG. 3 showing the coupling of the outer casing of the flexible drive cable.

As best shown in FIG. 4, the outer end of the end fitting 18 is provided with a connector or coupling 30 for attachment of the flexible drive cable 16 as described in more detail hereinafter. The illustrated connector 30 is a protrusion 32 which radially extends in an inward direction about the circumference of the passage 26 near the outer end of the passage 26. Preferably, the protrusion 32 is contiguous with the outer end of the end fitting 18 at the aperture 24. The protrusion 32 forms an inwardly facing abutment 34 which is substantially perpendicular to the longitudinal axis of the passage 26. The outer side of the illustrated protrusion 32 is provided with a frusto-conically shaped camming surface adapted to cooperate with the flexible drive cable 16 as described in more detail hereinafter.

Bearings or journals 38 are provided within the housing 12 to support a first end of the rotary element 14 and the end fitting 18 supports the second end of the rotary element 14. Mounted in this manner, the rotary element is rotatable about its longitudinal axis relative to the housing 12 and the end fitting 18. The second end of the rotary element 14 extends within the passage 26 of the end fitting 18 but does not extend entirely therethrough. The second end of the rotary element 14 is provided with a connector or coupling 40 for attachment of the flexible drive cable 16 as described in more detail hereinafter. The illustrated connector 40 is a blind recess or opening 42 which is substantially square-shaped in cross-section (best seen in FIG. 1). While the illustrated housing 12 is a gear box housing and the illustrated rotary element 14 is a worm gear, other embodiments suitable for other applications will be apparent to those skilled in the art given the benefit of this disclosure.

The flexible drive cable 16 includes an elongate flexible inner drive shaft or core 44 disposed within an elongate flexible outer sheath or casing 46. The core 44 is comprised of a flexible material and is provided with couplings or connectors 48 at its end to cooperate with the connector 40 of the rotary element 14. The illustrated core 44 is provided with an end section having a square cross-section sized and shaped for cooperation with the blind recess 42 in the end of the rotary element 14. With the end section of the core 44 inserted into the blind recess 42 of the rotary element 14, torque is transferable between the rotary element 14 and the core 44. It is noted that other connections for transferring torque therebetween will be apparent to those skilled in the art given the benefit of this disclosure.

The casing 46 has substantially coaxial inner and outer surface 50, 52. The inner surface 50 forms a longitudinally extending inner passage for closely receiving the core 44 and is sized and shaped to support the core 44 and act as a bearing surface for the rotating core 44. The end of the casing 46 is provided with a unitary coupling or connector 54 which cooperates with the connector 30 of the end fitting 18. The illustrated casing 46 is provided with a protrusion 56 which radially extends in an outward direction about the circumference of the casing outer surface 52 near the end of the casing 46. Preferably, the protrusion 56 is contiguous with the end of the casing 46. The protrusion 56 forms an inwardly facing abutment 58, that is an abutment facing away from the end of the casing 46 and toward the longitudinal center of the casing 46, which is substantially perpendicular to the longitudinal axis of the casing 46. The outer side of the illustrated protrusion 56 is provided with an camming surface 60 adapted to cooperate with the camming surface 36 of the housing end fitting 18. The casing abutment 58 is sized and shaped such that it cooperates with the end fitting abutment 34 to interlock and limit longitudinal movement of the casing 46 relative to the housing 12 and to retain the end of the casing 46 within the end fitting 18.

The casing 46 preferably comprises a soft resilient plastic such as, for example, a thermoplastic elastomer (TPE) like SANTOPRENE or other suitable low durometer plastic. The casing 46 can be formed by any suitable manner such as, for example, by an extrusion process.

Figure 4A:
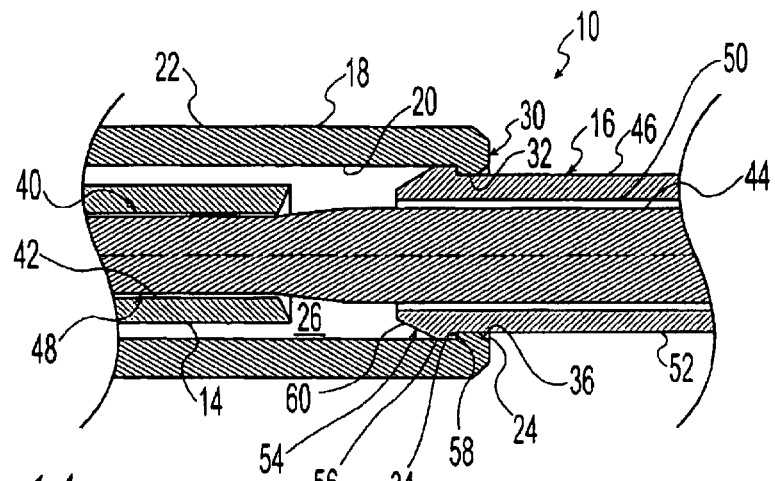
FIG. 4A is an enlarged, fragmented view of a portion of FIG. 3 similar to FIG. 4 but showing an alternative coupling of the outer casing of the flexible drive cable.
Figure 5:
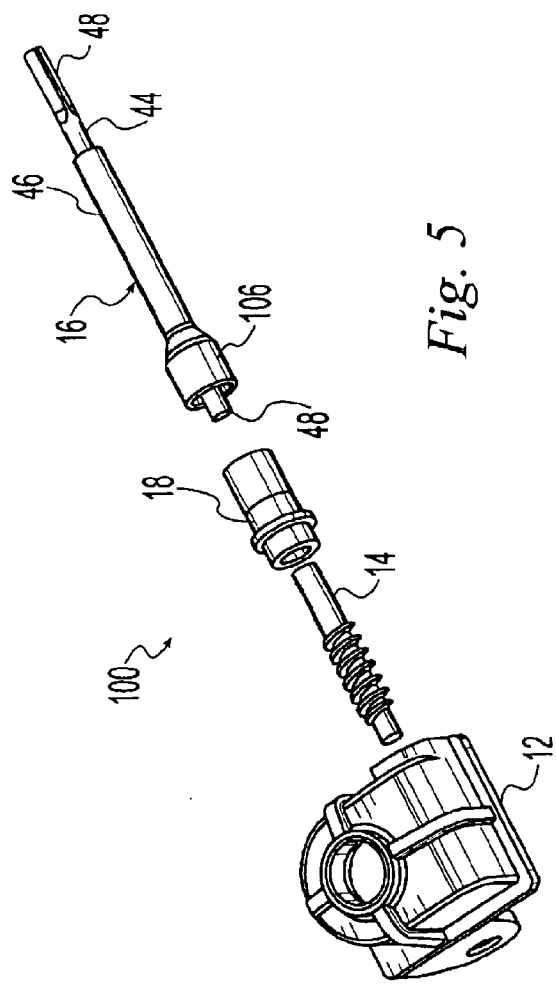
FIG. 5 is an exploded perspective view of a flexible drive cable connection according a second preferred embodiment of the present invention.

FIG. 4A illustrates an alternative embodiment of the casing 46. The protrusion 56 forms an abutment 58 which is substantially perpendicular to the longitudinal axis of the casing 46 and the camming surface 60 is generally frusto-conically shaped. This embodiment can be formed by any suitable manner such as, for example, by an insert molding process.

The casing connector 54 and the end fitting connector 30 cooperate to form a "snap-fit connection" between the casing 46 and the end fitting 18. To connect the casing 46 and the end fitting 18, the end of the casing 46 is placed at the aperture 24 such that the casing camming surface 60 engages the end fitting camming surface 36. A force is applied to the casing 46 in the longitudinal direction such that the end fitting camming surface 36 inwardly deflects and/or deforms the casing protrusion 56 such that it axially passes the end fitting protrusion 32 and into the end fitting passage 26. It is noted that a plurality of longitudinally extending and circumferentially spaced apart slits or slots can be provided in the end of the casing 46 to such that the protrusion is located on a plurality of deflectable protrusions to increase the delectability of the protrusion 56. Once the casing abutment 58 is axially moved past the end fitting abutment 34, the casing protrusion 56 resiliently snaps radially outward such that the abutments 58, 34 interlock to limit axial movement of the casing 46 and prevent removal of the casing 46 from the end fitting 18. Secured in this manner, the end of the casing 46 is held stationary relative to the housing end fitting 18.

The casing protrusion 56 is preferably sized and shaped to engage the inner surface 20 of the end fitting passage 26 with an interference fit, that is, the inner surface 20 of the end fitting passage 26 prevents the complete radially outward return of the protrusion 56 to its relaxed state. This elastic force pressuring the protrusion 56 against the inner surface 20 of the end fitting passage 26 reduces vibration of the casing 46 against the end fitting 18 to reduce noise. It is noted that the distance between the end of the casing 46 and the end of the rotary element 14, that is the distance between ends of the journals of the core 44, is preferably short enough to prevent vibration of the core 44 therebetween which can cause contact of the core 44 with other components to cause noise. In the illustrated embodiment, the distance between the end of the casing 46 and the end of the rotary element 14 is equal to about the diameter of the core 44.

During operation, the rotary element 14 is rotated and the rotary motion is transmitted to the core 44 through the connectors 40, 48. The core 44 rotates within the casing 46 and transfers the rotary motion to the driven element connected to the other end of the core 44. The casing 46 remains stationary relative to the housing end fitting 18 as the core 44 rotates within the casing 46. Noise is reduced compared to prior art designs because the interference fit of the snap-fit connection between the casing 46 and the housing end fitting 18 and the minimized distance between the journals of the core 44 each eliminate vibrations which can cause noise.

Referring now to the drawings, FIGS. 5 to 8 show a flexible drive cable assembly 100 according to a second preferred embodiment of the present invention wherein like reference numbers are utilized to indicate like structure. The drive cable assembly 100 according to the second embodiment is substantially similar to the drive cable assembly 10 according to the first embodiment except for the unitary connector 54 of the casing 46 and the unitary connector 30 of the housing end fitting 18.

Figure 8:
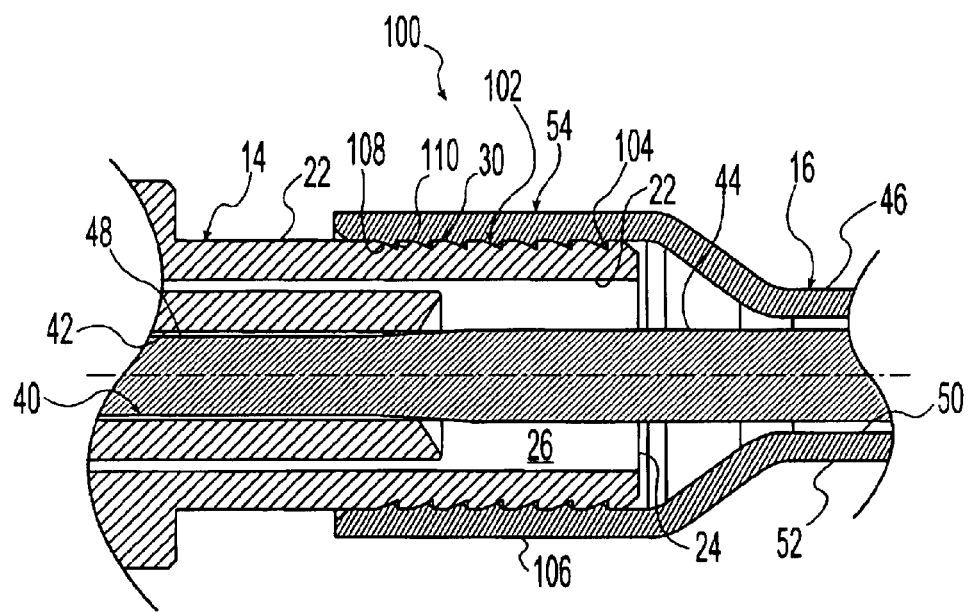
FIG. 8 is an enlarged, fragmented view of a portion of FIG. 7 showing the coupling of the outer casing of the flexible drive cable.

As best shown in FIG. 8, the outer end of the end fitting 18 is provided with a connector 30 for attachment of the flexible drive cable 16 as described in more detail hereinafter. The illustrated connector 30 is a plurality of grooves or recesses 102 which radially extend into the outer surface 22 of the end fitting 18 and extend about the circumference of the end fitting 18. The illustrated grooves 102 are axially spaced apart along the length of the end fitting 18 but other suitable configurations can be utilized such as, for example, a single spiral shaped groove can be utilized. The grooves 102 each form an inwardly facing abutment 104, that is facing toward the housing 12 and away from the outer end of the end fitting 18, which is substantially perpendicular to the longitudinal axis of the passage 26. The illustrated grooves 102 are generally "saw-tooth-shaped" in cross section to form the abutments 104.

The end of the casing 46 is provided with a unitary connector 54 which cooperates with the connector 30 of the housing end fitting 18. The illustrated casing 46 is provided with an enlarged end portion 106. The enlarged end portion 106 has an inner diameter sized for closely receiving outer surface 22 of the end fitting 18. The remaining or central portion of the casing 46 has an inner diameter sized for closely receiving the core 44 which has an outer diameter smaller than the outer diameter of the housing end fitting 18. During assembly, inwardly extending protrusions 108 are formed which extend from the inner surface of the end portion 106 into the end fitting grooves 102. The protrusions 108 are preferably formed by heat staking the casing end portion 106 after the casing end portion 106 is placed onto the housing end fitting 18. The casing end portion 106 is heat staked by applying heat and pressure to the end portion 106 so that material of the end portion flows into the grooves 102 to form the protrusions 108. Preferably, the protrusions 108 substantially fill the entire space of the grooves 102 so that the inner surface of the casing end portion 106 substantially conforms to the outer surface 22 of the housing end fitting 18. The protrusions 108 form inwardly facing abutments 110, that is abutments facing away from the end of the casing 46 and toward the longitudinal center of the casing 46, which are substantially perpendicular to the longitudinal axis of the casing 46. The casing abutments 110 cooperate with the end fitting abutments 104 to interlock and limit longitudinal movement of the casing 46 relative to the housing 12 and to retain the end of the casing 46 to the end fitting 18.

The casing 46 preferably comprises a soft plastic such as, for example, a thermoplastic elastomer (TPE) like SANTOPRENE or other suitable low durometer plastic. The casing 46 can be formed by any suitable manner such as, for example, by an extrusion process.

The casing connector 54 and the end fitting connector 30 cooperate to form an interlocking connection between the casing 46 and the end fitting 18. To connect the casing 46 and the end fitting 18, the end portion 106 of the casing 46 is placed over the end fitting outer surface 22. Heat and pressure are applied to the casing end portion 106 to flow casing material into the end fitting grooves 102 and form the protrusions 108. Once the casing protrusions 108 are formed, the casing protrusions 108 cooperate with the groove abutments 104 to limit axial movement of the casing 46 and prevent removal of the casing 46 from the end fitting 18. Secured in this manner, the end of the casing 46 is held stationary relative to the housing end fitting 18.

The heat staking of the casing end portion 106 causes the end portion 106 to engage the outer surface 22 of the end fitting 18 with an interference fit. This force pressuring the casing end portion 106 against the outer surface 22 of the end fitting 18 eliminates vibration of the casing 46 against the end fitting 8 to reduce noise. It is noted that the distance between the inner end of the casing enlarged end portion 106 and the end of the rotary element 14, that is the distance between ends of the journals of the core 44, is preferably short enough to prevent vibration of the core 44 therebetween which may cause the core 44 to contact other components to cause noise.

During operation, the rotary element 14 is rotated and the rotary motion is transmitted to the core 44 through the connectors 40, 48. The core 44 rotates within the casing 46 and transfers the rotary motion to the driven element connected to the other end of the core 44. The casing 46 remains stationary relative to the housing 12 as the core 44 rotates within the casing 46. Noise is reduced compared to prior art designs because the interference fit of the connection between the casing 46 and the housing end fitting 18 and the minimized distance between the journals of the core 44 each eliminate vibrations which can cause noise.

Figure 9:
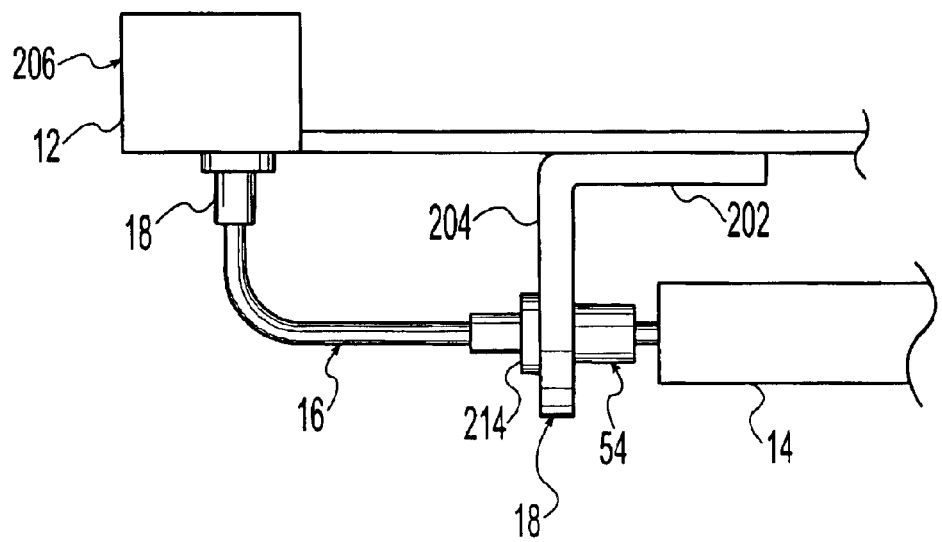
FIG. 9 is a plan view of a flexible drive cable connection according a third preferred embodiment of the present invention.
Figure 10:
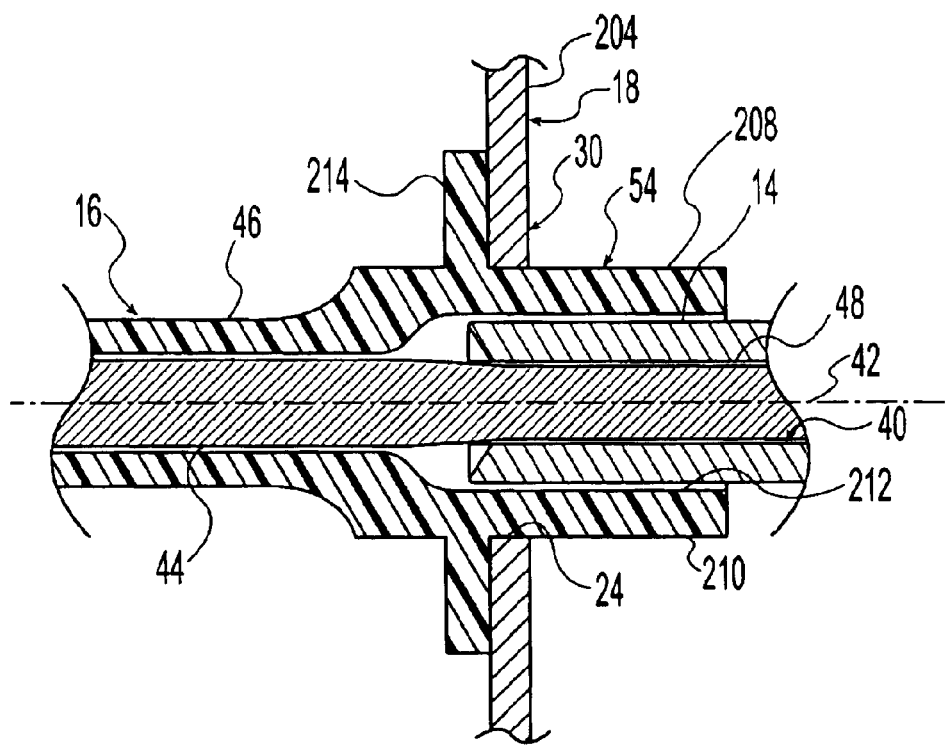
FIG. 10 is an enlarged, fragmented view of a portion of FIG. 9, in cross-section, showing the coupling of the outer casing of the flexible drive cable.

Referring now to the drawings, FIGS. 9 and 10 show a flexible drive cable assembly 200 according to a third preferred embodiment of the present invention wherein like reference numbers are utilized to indicate like structure. The drive cable assembly 200 according to the second embodiment is substantially similar to the drive cable assemblies 10, 100 according to the first and second embodiments except for the unitary connector 54 of the casing 46 and the connector 30 of the end fitting 18. In the third embodiment, the rotary element 14 is a lead screw of an adjustable seat which is driven by the flexible drive cable 16 and the end fitting 18 is a stationary mounting bracket located at an end of the lead screw 14. The illustrated mounting bracket 18 has a mounting portion 202 and a supporting portion 204 extending substantially perpendicular from the mounting portion 202. The supporting portion 202 is generally planar and has the aperture or opening 24 formed therein. The other end of the flexible drive cable 16 is driven by the gear box 206 described hereinabove with regard to the first and second embodiments of the present invention and is connected in any desirable manner such as either of the first or second embodiments of the present invention.

As best shown in FIG. 10, the end of the casing 46 is provided with a unitary connector 54 which cooperates with the supporting portion 204 of the mounting bracket 18. The illustrated casing 46 is provided with an elongate portion 208 having a generally cylindrically-shaped outer surface 210 and a generally cylindrically shaped inner surface 212 substantially coaxial with the outer surface 210. The inner surface 212 of the elongate portion 208 has an inner diameter sized for closely receiving outer surface of the rotary element 14, that is, the end of the lead screw. Formed in this manner the elongate portion 208 forms a journal for supporting the end of the rotary element 14. Note that the rotary element 14 preferably extends into the elongate portion 208 a distance adequate to extend to the aperture 24 of the mounting bracket 18. The outer surface 210 of the elongate portion has an outer diameter sized and shaped to extend through the aperture 24 of the mounting bracket 18 and form a press fit with the aperture 24, that is, a tight or interference fit such that at least a substantial portion of the edge of the aperture 24 engages the outer surface 210 of the elongate portion 208 to prevent vibration therebetween and to secure the casing unitary connector 54 to the end fitting 18. The unitary connector 54 also includes a generally planar flange 214 which radially extends in an outward direction from the outer surface 210 of the elongate portion 208. The flange 214 is located along the elongate portion 208 at a location such that the flange 214 engages the mounting bracket 18 when the connector 54 of the casing 46 is at a desired axial position relative to the rotary element 14.

The casing 46 preferably comprises a soft plastic such as, for example, a thermoplastic elastomer (TPE) like SANTOPRENE or other suitable low durometer plastic. The casing 46 can be formed by any suitable manner such as, for example, by an insert molding process.

The casing connector 54 and the end fitting connector 30 cooperate to form a connection between the casing 46 and the end fitting 18. To connect the casing 46 and the end fitting 18, the elongate portion 208 of the casing 46 is inserted into the aperture 24 of the end fitting 18. Force must be applied to the casing connector 54 to press the casing connector 54 into the aperture 24 until the flange 214 engages the end fitting 18 adjacent the aperture 24. Also, the end of the core 44 is inserted into the blind recess 42 of the rotary element 14. Secured in this manner, the end of the casing 46 is held stationary relative to the end fitting 18 and the rotary element 14 is movable with the core 44.

The press fit of the casing elongate portion 208 causes the elongate portion 208 to engage the aperture 24 of the end fitting with an interference fit. This force pressuring the casing elongate portion 208 against the inner surface of the end fitting aperture 24 eliminates vibration of the casing 46 against the end fitting 18 to reduce noise. It is noted that the distance between the inner end of the casing elongate portion 208 and the end of the rotary element 14, that is the distance between ends of the journals of the core 44, is preferably short enough to prevent vibration of the core 44 therebetween which can cause contact of the core 44 with other components, such as the casing 46, to cause noise.

During operation, the core 44 is rotated by the gear box 206 and the rotary motion is transmitted to the rotary element 14 through the connectors 40, 48. The core 44 rotates within the casing 46 and transfers the rotary motion from the driving element 206 at the other end of the core 44.

The casing 46 remains stationary relative to the end fitting 18 as the core 44 rotates within the casing 46. Noise is reduced compared to prior art designs because the interference fit of the connection between the casing 46 and the end fitting 18 and the minimized distance between the journals of the core 44 each eliminate vibrations which can cause noise.

Figure 11:
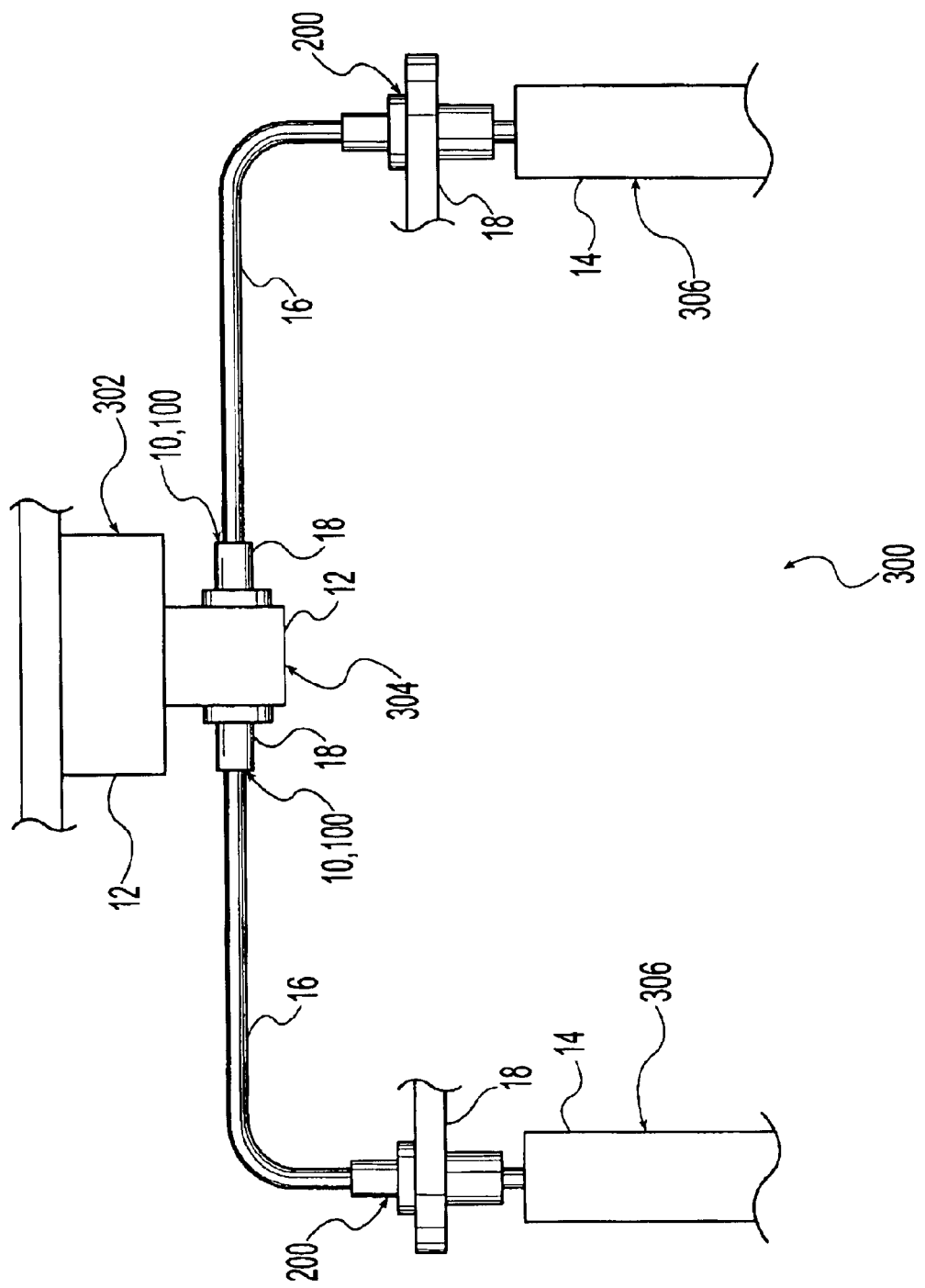
FIG. 11 is a plan view of a portion of a powered adjustable seat for a motor vehicle having flexible drive cable connections according the present invention.

FIG. 11 illustrates a portion of a seat track assembly 300 for a powered adjustable seat which utilizes flexible drive cables 16 according to the present invention, wherein like reference numbers are utilized for like structure. The seat track assembly 300 utilizes a single motor 302 and gear box 304 to drive a pair of parallel and spaced-apart lead screws 306 to selectively move tracks to adjust the position of the seat. The gear box 304 is directly coupled to the motor 302 without the use of a flexible drive cable 16. However, the pair of flexible drive cables 16 are utilized to connect the lead screws 306 to the gear box 304. The flexible drive cables 16 extend from opposite sides of the gear box 304 to the respective lead screws 306. Each flexible drive cable 16 is preferably connected to the gear box 304 according to either the first or second embodiment of the present invention 10, 100 described in detail hereinabove and is preferably connected to the lead screw 306 according to the third embodiment of the present invention 200 described in detail herein above. The adjustable seat 300 illustrates that the connections at the ends of each flexible drive cable 16 can be different. It is noted, however, that the connections can alternatively be the same at each end of the flexible drive cable 16 and/or any type of connection can be alternatively utilized at either end of the flexible drive cable 16. This adjustable seat 300 according to the present invention also illustrates that a single gear box 304 can be utilized to connect two lead screws 306 to the motor 302. Prior art designs connect a pair of gear boxes to the motor with a pair of flexible drive cable assembles and connect the gear boxes to a pair of drive screws using a pair of flexible drive cable assemblies. The adjustable seat 300 according to the present invention, therefore, eliminates a gear box and a pair of flexible drive cable assemblies to reduce cost, complexity, and noise.

Figure 12:
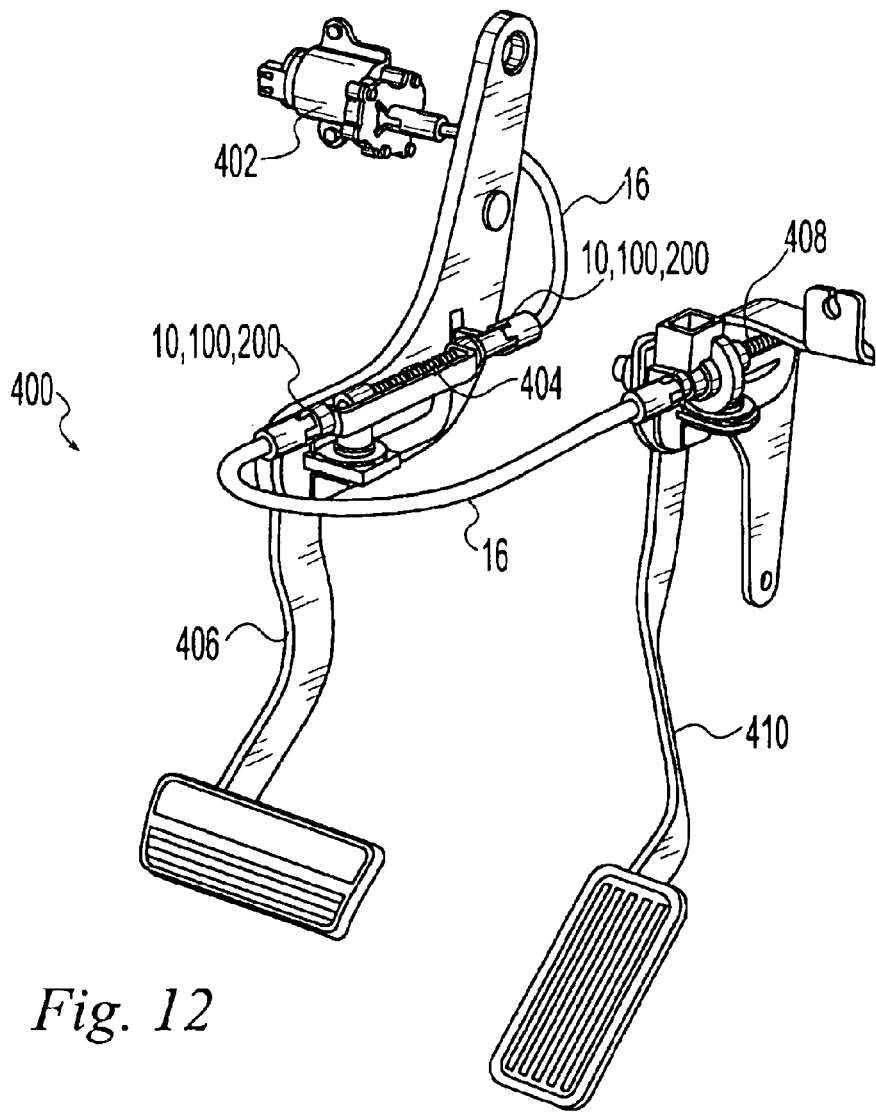
FIG. 12 is a plan view of powered adjustable pedals for a motor vehicle having flexible drive cable connections according the present invention.
Figure 13:
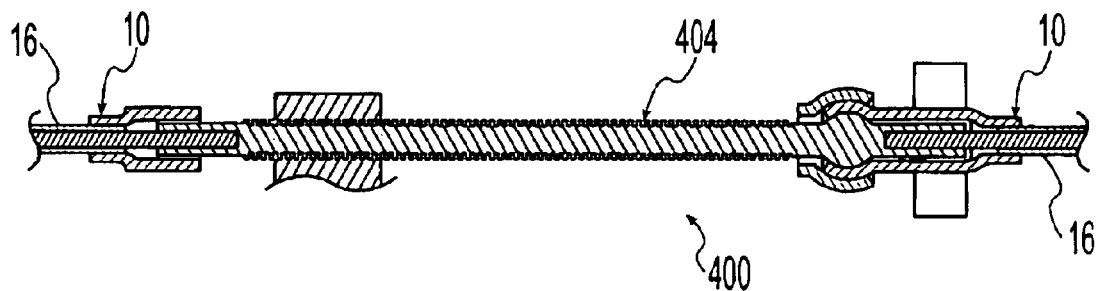
FIG. 13 is an enlarged, fragmented view of a portion of FIG. 12, in cross-section, showing coupling of the outer casings of the flexible drive cable.

FIGS. 12 and 13 illustrate powered adjustable pedals 400 utilizing flexible drive cables 16 according to the present invention. An electric motor 402 is connected to a drive screw 404 of a drive assembly for a brake pedal 406 by a first flexible drive cable 16 and the drive screw 404 of the brake pedal 406 is connected to the drive screw 408 of a drive assembly for an accelerator pedal 410 by a second flexible drive cable 16. See U.S. patent application Ser. No. 09/492,238, the disclosure of which is expressly incorporated herein in its entirety by reference, for a more detailed description of the drive assemblies 404, 408 of the brake and accelerator pedals 406, 410. The embodiment of the adjustable pedals 400 illustrated in FIG. 13 utilizes flexible drive cable connections 10 according to the first embodiment of the present invention described in detail hereinabove. As shown in FIG. 12, is noted that the drive cables 16 can utilize any one or combination of the connections of the first second or third embodiments 10, 100, 200.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the unitary connector of the casing can each have many different configurations and materials.

The embodiments discussed were chosen and described to provide the best illustration of the principles of the present invention and its practical application to thereby enable one of ordinary skill in the art to utilize the invention in various embodiments and with various modifications as are suited to the particular use contemplated.

All such modifications and variations are within the scope of the present invention as determined by the appended claims when interpreted in accordance with the benefit to which they are fairly, legally, and equitably entitled.

What is claimed is:

1. An adjustable pedal assembly comprising, in combination:
    a flexible drive cable assembly comprising:
        an elongate flexible core for transmitting movement from a first end of the core to a second end of the core;
        an elongate flexible casing encircling a longitudinal length of the core and having a preformed unitary connector at one end; and
        wherein the first end of the core has a first connection and the second end of the core has a second connection and the casing extends along the longitudinal length of the core from the first connection of the core to the second connection of the core;
    an end fitting having an aperture for passage of the core therethrough;
    wherein the unitary connector of the casing cooperates with the end fitting to secure the casing to the end fitting and hold the casing stationary relative to the end fitting;
    an electric motor operably connected to the core for transmission of movement therebetween;
    at least one drive screw operably connected to the core for transmission of movement therebetween; and
    wherein the flexible drive cable assembly connects the electric motor and the drive screw such that operation of the electric motor rotates the drive screw.

2. The adjustable pedal assembly according to claim 1, wherein the unitary connector of the casing and the end fitting form a snap-fit connection.

3. The adjustable pedal assembly according to claim 2, wherein the unitary connector of the casing comprises a deflectable protrusion interlocking with the end fitting to secure the casing to the end fitting.

4. The adjustable pedal assembly according to claim 3, wherein the protrusion forms an interference fit with the end fitting to reduce vibration therebetween.

5. The adjustable pedal assembly according to claim 2, wherein the unitary connector of the casing comprises a protrusion disposed radially outward and generally encircling an outer circumference of the casing, the aperture of the end fitting opens into a passage having a protrusion disposed radially inward and generally encircling an inner circumference of the passage, and the casing extends into the passage with the protrusion of the casing interlocking with the protrusion of the end fitting to secure the casing to the end fitting.

6. The adjustable pedal assembly according to claim 1, wherein the unitary connector of the casing comprises a protrusion disposed radially outward and generally encircling an outer circumference of the casing, the aperture of the end fitting opens into a passage having a protrusion disposed radially inward and generally encircling an inner circumference of the passage, and the casing extends into the passage with the protrusion of the casing interlocking with the protrusion of the end fitting to secure the casing to the end fitting.

7. The adjustable pedal assembly according to claim 1, wherein the end fitting has an elongated portion with an outer surface, the outer surface of the elongated portion has at least one groove formed therein, the casing has a generally coaxial inner and outer surfaces, the casing extends over the elongated portion with the inner surface of the casing engaging the outer surface of the elongated portion, and the casing has at least one protrusion extending from the inner surface of the casing and into the groove of the elongated portion to interlock the casing with the end fitting.

8. The adjustable pedal assembly according to claim 7, wherein the protrusion is formed by heat staking the casing at the elongated connector.

9. The adjustable pedal assembly according to claim 1, wherein the unitary connector comprises an elongated portion having a generally cylindrically shaped outer surface extending through the aperture of the end fitting and a flange extending generally perpendicular to the outer surface of the elongated portion and engaging the end fitting adjacent the aperture of the end fitting.

10. The adjustable pedal assembly according to claim 9, wherein the outer surface of the elongated portion forms a press fit with the aperture of the end fitting.

11. The adjustable pedal assembly according to claim 1, wherein the unitary connector comprises an elongated portion having a generally cylindrically shaped outer surface extending through the aperture of the end fitting and forms a press fit with the aperture of the end fitting.

12. An adjustable pedal assembly comprising, in combination:
    a flexible drive cable assembly comprising:
        an elongate flexible core for transmitting movement from a first end of the core to a second end of the core; and
        an elongate flexible casing encircling a longitudinal length of the core and having a preformed, unitary connector with at least one deflectable protrusion;
    an end fitting having an aperture for passage of the core therethrough;
    wherein the connector of the casing and the end fitting form a snap-fit connection to secure the casing to the end fitting and hold the casing stationary relative to the end fitting and the deflectable protrusion of the connector engages the end fitting with an interference fit such that the deflectable protrusion is in an unrelaxed state to reduce vibration between the casing and the end fitting;
    an electric motor operably connected to the core for transmission of movement therebetween;
    at least one drive screw operably connected to the core for transmission of movement therebetween; and
    wherein the flexible drive cable assembly connects the electric motor and the drive screw such that operation of the electric motor rotates the drive screw.

13. The adjustable pedal assembly according to claim 12, wherein the interference fit is in a direction transverse to a longitudinal axis of the casing.

14. The adjustable pedal assembly according to claim 12, wherein the deflectable protrusion is disposed radially outward and generally encircles an outer circumference of the casing, the aperture of the end fitting opens into a passage having a protrusion disposed radially inward and generally encircling an inner circumference of the passage, and the casing extends into the passage with the deflectable protrusion of the casing interlocking with the protrusion of the end fitting to secure the casing to the end fitting.

15. An adjustable pedal assembly comprising, in combination:
- a flexible drive cable assembly comprising:
  - an elongate flexible core for transmitting movement from a first end of the core to a second end of the core; and
  - an elongate flexible casing encircling a longitudinal length of the core and having generally coaxial inner and outer surfaces;
- an end fitting having an elongated portion with an outer surface and an aperture for passage of the core therethrough, the outer surface of the elongated portion having at least one groove formed therein;
- wherein the casing has a preformed enlarged cylindrically-shaped end portion forming an end surface of the casing and having an inner diameter closely receiving the elongated portion of the end fitting;
- wherein the casing has at least one protrusion extending from the inner surface of the casing and into the groove of the elongated portion to interlock the casing with the end fitting and to hold the casing stationary relative to the end fitting;
- an electric motor operably connected to the core for transmission of movement therebetween;
- at least one drive screw operably connected to the core for transmission of movement therebetween; and
- wherein the flexible drive cable assembly connects the electric motor and the drive screw such that operation of the electric motor rotates the drive screw.

16. The adjustable pedal assembly according to claim 15, wherein the protrusion is formed by heat staking the casing at the elongated connector.

17. The adjustable pedal assembly according to claim 15, wherein the outer surface of the elongated surface has a plurality of grooves and the casing has a plurality of protrusions extending into the grooves.

18. An adjustable pedal assembly comprising, in combination:
- a flexible drive cable assembly comprising:
  - an elongate flexible core for transmitting movement from a first end of the core to a second end of the core;
  - an elongate flexible casing encircling a longitudinal length of the core and having a connector; and
  - wherein the connector comprises a preformed, unitary enlarged end portion having a generally cylindrically shaped outer surface and a flange extending generally perpendicular to the outer surface of the elongated portion;
- an end fitting having an aperture for passage of the core therethrough;
- wherein the outer surface of the connector extends through the aperture of the end fitting and the flange of the connector engages the end fitting adjacent the aperture of the end fitting to secure the casing to the end fitting and to hold the casing stationary relative to the end fitting;
- an electric motor operably connected to the core for transmission of movement therebetween;
- at least one drive screw operably connected to the core for transmission of movement therebetween; and
- wherein the flexible drive cable assembly connects the electric motor and the drive screw such that operation of the electric motor rotates the drive screw.

19. The adjustable pedal assembly according to claim 18, wherein the outer surface of the enlarged end portion forms a press fit with the aperture of the end fitting.

20. The adjustable pedal assembly according to claim 18, wherein the enlarged end portion of the connector forms a journal for supporting an end of one of the electric motor and the drive screw.

* * * * *